UNITED STATES PATENT OFFICE.

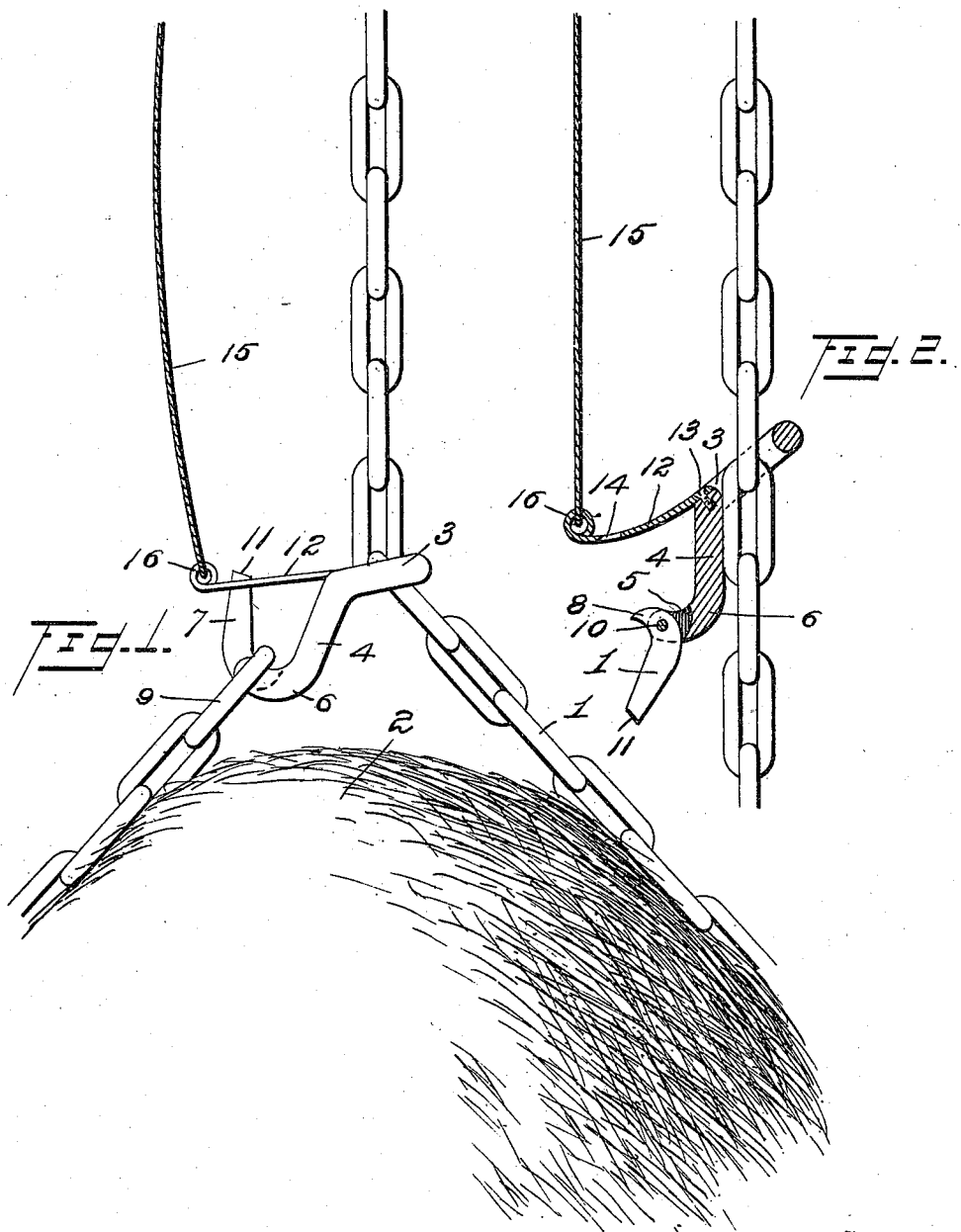

CLAYTON D. REES, OF MEDFORD, OREGON, ASSIGNOR OF ONE-HALF TO JAMES E. STARNES, OF MEDFORD, OREGON.

RELEASING-HOOK.

984,852. Specification of Letters Patent. Patented Feb. 21, 1911.

Application filed August 25, 1910. Serial No. 578,882.

*To all whom it may concern:*

Be it known that I, CLAYTON D. REES, a citizen of the United States, residing at Medford, in the county of Jackson and State of Oregon, have invented certain new and useful Improvements in Releasing-Hooks, of which the following is a specification.

This invention relates to releasing hooks designed more particularly for use on load binders, and one of the principal objects of the invention is to provide a hook which can be quickly released for dumping the load.

Another object of the invention is to provide a releasing hook having a loop through which the chain extending around the load will freely slide to tighten said chain around the load, said hook having a pivoted releasing member and a spring for holding said releasing member in position to permit the load to be lifted, said spring being provided with a tripping cord, by means of which the releasing member may be disconnected to dump the load.

These and other objects may be attained by means of the construction illustrated in the accompanying drawing, in which, Figure 1 is a side elevation of the load binder provided with a releasing hook made in accordance with my invention, said load binder being shown in position for being lifted. Fig. 2 is a side elevation and partial section of the releasing hook in its open position with a portion of the sling chain extending through the loop of the hook.

Referring to the drawing the numeral 1 designates a chain designed to be used as a sling for surrounding a load 2 of hay or other material desired to be lifted and dumped.

My releasing hook is provided with a loop 3 through which one end of the chain 1 is passed and through which said chain freely slides. Extending at an inclination from the loop 3 is a shank 4, said shank having a bifurcated end 5, said shank being slightly curved as at 6. Pivoted in the bifurcation 5 is a releasing member 7, said member having a projection 8 which is designed to carry the link 9 at the end of the chain out of the hook when the releasing member is disconnected for dumping the load. The releasing member 7 is pivoted upon a pintle 10 and the outer end of said releasing member is beveled as at 11 to ride underneath a curved spring 12. The spring 12 is secured by means of a screw 13 to the shank 4 of the hook and is provided with an opening 14, through which the upper end of the releasing member 7 extends when the hook is in its locked position. A tripping cord 15 is secured to a ring 16 formed on the outer end of the spring 12.

The operation of my invention may be briefly described as follows: The sling chain is passed around the load and connected to the releasing hook. The releasing member 7 is thrown up and engaged with the opening 14 in the spring 12. When the load is lifted the chain freely slides through the loop 3 of the hook to bind the load. When it is desired to dump the load the cord 15 is drawn upward and the releasing member 7 is moved upon its pintle to the position shown in Fig. 2, the projection 8 serving to throw the link 9 out of the hook.

From the foregoing it will be obvious that a releasing hook made in accordance with my invention is simple in construction; reliable and efficient in use; can be manufactured at low cost and cannot readily get out of order.

I claim:

A releasing hook for load binders comprising a loop through which a sling chain may freely slide, a shank extending at an angle to said loop, said shank being curved and bifurcated, a releasing member pivoted in the bifurcations of said shank, said releasing member having a projection at one end and beveled at the opposite end, a spring releasing device consisting of a flat metal spring secured to the shank of the hook and provided with an opening through which the beveled end of the releasing member is designed to pass, and a tripping cord connected to said spring for tripping the releasing member.

In testimony whereof I affix my signature in presence of two witnesses.

CLAYTON D. REES.

Witnesses:
J. H. CORKIN,
G. O. TAYLOR.